United States Patent
Huang

(10) Patent No.: US 9,039,555 B2
(45) Date of Patent: May 26, 2015

(54) DUAL ELECTRIC DRIVING DEVICE AND INNER SPEED SHIFTING DUAL ELECTRIC MOTOR WITH CLUTCHING AND SPEED REDUCING DRIVING DEVICE THEREOF

(71) Applicant: Yung-Sung Huang, Taipei (TW)

(72) Inventor: Yung-Sung Huang, Taipei (TW)

( * ) Notice: Subject to any disclaimer, the term of this patent is extended or adjusted under 35 U.S.C. 154(b) by 28 days.

(21) Appl. No.: 13/736,167

(22) Filed: Jan. 8, 2013

(65) Prior Publication Data

US 2014/0102250 A1    Apr. 17, 2014

(30) Foreign Application Priority Data

Oct. 16, 2012    (TW) .............................. 101138133 A

(51) Int. Cl.
*F16D 3/72* (2006.01)
*B60K 1/02* (2006.01)
*F16H 37/06* (2006.01)
*B62M 6/55* (2010.01)
*B62M 6/45* (2010.01)
*B62M 6/80* (2010.01)

(52) U.S. Cl.
CPC ......... *F16H 37/065* (2013.01); *Y10T 74/19014* (2015.01); *B60K 1/02* (2013.01); *B62M 6/55* (2013.01); *B62M 6/45* (2013.01); *B62M 6/80* (2013.01); *B60Y 2200/13* (2013.01)

(58) Field of Classification Search
CPC .............. F16H 3/72; B60K 2007/0069; B60K 2007/0084
USPC .......................................... 475/5, 8, 151, 152
See application file for complete search history.

(56) References Cited

U.S. PATENT DOCUMENTS

| | | | | |
|---|---|---|---|---|
| 2,571,172 A * | 10/1951 | Robin et al. | ....................... | 475/5 |
| 6,296,072 B1 * | 10/2001 | Turner | ........................... | 180/220 |
| 7,357,743 B2 * | 4/2008 | Mao et al. | ......................... | 475/5 |
| 7,669,684 B2 * | 3/2010 | Rogg | ............................ | 180/264 |
| 8,636,095 B2 * | 1/2014 | Ito | .............................. | 180/206.6 |
| 2005/0176542 A1 * | 8/2005 | Lo | ..................................... | 475/5 |
| 2011/0015021 A1 * | 1/2011 | Maguire et al. | ................... | 475/8 |

* cited by examiner

*Primary Examiner* — Robert Hodge
*Assistant Examiner* — Ryan Dood
(74) *Attorney, Agent, or Firm* — Bacon & Thomas, PLLC

(57) ABSTRACT

A dual electric driving device, comprising: a main driving motor including a driving rotary shaft, with a shifting transmission gear being mounted on the front end of the driving rotary shaft; an outputting module being correspondingly mounted on the shifting transmission gear, the outputting module including a shifting driving shaft being rotatable by a driving force of the shifting transmission gear; a clutching and speed reducing driving device being correspondingly sleeved onto the back end of the driving rotary shaft of the main driving motor and coaxially rotatable by being engaged with the driving rotary shaft in one single direction; and an accessory driving motor including a driving shaft, the driving shaft being correspondingly mounted through the clutching and speed reducing driving device, and further being able to push the driving rotary shaft in one single direction to rotate by driving the clutching and speed reducing driving device.

13 Claims, 4 Drawing Sheets

DUAL ELECTRIC DRIVING DEVICE AND INNER SPEED SHIFTING DUAL ELECTRIC MOTOR WITH CLUTCHING AND SPEED REDUCING DRIVING DEVICE THEREOF

CROSS-REFERENCE TO RELATED APPLICATION

This application claims the benefit of Taiwan Patent Application No. 101138133, filed on Oct. 16, 2012, in the Taiwan Intellectual Property Office, the disclosure of which is incorporated herein in its entirety by reference.

BACKGROUND OF THE INVENTION

1. Field of the Invention

The present invention generally relates to a dual electric driving device and inner speed shifting dual electric motor with clutching and speed reducing driving device thereof, in particular to an electric driving device applying a dual electric motor as the driving module to optimize the outputting efficiency.

2. Description of the Related Art

Using an electric apparatus such as the motor and so on together with the driving source like the electricity to drive the mechanical force operating is a common driving method based on dynamics. Generally speaking, the electric apparatus, such as the motor, mainly assembles the outputting shaft and the device to be driven, and then transmits the torsional output to drive the device to be driven.

In the present art, dynamics driving module mainly uses a single electric driving device as the driving source. Therefore, if the dynamics driving module is applied to the electric bicycle, electric motorcycle or other movable devices driven by the electricity, in order to overcome the resistance generated under the condition of inclined landforms, it should be able to generate sufficient horsepower at the initial stage. And such a practice inevitably needs to consume a huge amount of power. Furthermore, the optimal torsional output of the traditional single motor under the condition of high speed would achieve the best torsional performance. And if the module is used to start up under full load, the only method is to adopt frequency-switching or voltage-regulating techniques to start up and drive up. However, a huge amount of power is consumed within the process, and if the consumption of electricity goes too much, the problem of insufficient continuity would be easily resulted in, thus the requirement of both energy-saving and electricity-saving could not be satisfied, and the initial dynamic the module provides remains restricted. This is also a problem of continuity difficult to be solved for electric driving devices such as current electric bicycle and so forth. It is a pity that the module has the shortage in practice.

In summation, the inventor of the present invention consider and design a dual electric driving device and inner speed shifting dual electric motor with clutching and speed reducing driving device thereof in order to ameliorate the technical shortage and then improve the implement and utilization in industrial field.

SUMMARY OF THE INVENTION

Based on the aforementioned problems in prior arts, one objective of the present invention is to provide a dual electric driving device and inner speed shifting dual electric motor with clutching and speed reducing driving device thereof to overcome the problems in current technique.

In order to achieve the object mentioned above, the technical method adopted by the present invention is to design a dual electric driving device, comprising: a main driving motor including a driving rotary shaft, a front end of the driving rotary shaft extending downward and a back end of the driving rotary shaft extending upward, with a steering gear being mounted on the front end of the driving rotary shaft; an outputting module being correspondingly mounted on the steering gear, the outputting module including a shifting driving shaft being rotatable by a driving force of the steering gear; a clutching and speed reducing driving device being correspondingly sleeved onto the back end of the driving rotary shaft of the main driving motor and coaxially rotatable by being engaged with the driving rotary shaft in one single direction; and an accessory driving motor including a driving shaft, the driving shaft being correspondingly mounted through the clutching and speed reducing driving device, and further being able to push the driving rotary shaft in one single direction to rotate by driving the clutching and speed reducing driving device.

Wherein the outputting module further comprises an outputting frame having a hole on an upper surface to allow the steering gear to be mounted through, and a first axial hole and a second axial hole being respectively disposed on two horizontal ends of the outputting frame and passing therethrough; wherein the steering gear correspondingly is mounted to pass through the outputting frame and penetrates both the first axial hole and the second axial hole.

Wherein the clutching and speed reducing driving device comprises an outer housing, an inner housing, a speed reducing gear train, and a single direction clutching bearing; wherein the outer housing is a hollowing housing with openings on two ends, and an inner gear ring is disposed on the middle portion of the inner ring surface of the outer housing, a plurality of cog structures are disposed on the inner ring surface of the inner gear ring; the inner housing is a housing with hollowing inner and circular outer ring surface, and mounted through the outer housing corresponding the cog structure and correspondingly rotates inside the outer housing, a plurality of openings are mounted on the outer ring surface of the inner housing, and the inner housing extends downward to form an attaching frame, a clutching chamber is in the inward concave of the attaching frame; wherein the speed reducing gear train is correspondingly mounted in the inner housing, comprising a central gear and a plurality of speed reducing gears, the central gear is correspondingly mounted in the center of the inner housing, number of the speed reducing gears corresponds to the openings, and the speed reducing gears are correspondingly disposed around a periphery of the central gear and fits to the central gear with each other, each of the speed reducing gears has a disposed location, and each of the disposed locations respectively corresponds to one of the openings, each of the speed reducing gear locally mounts through the hole and fits to the cog structure; wherein the single direction clutching bearing is correspondingly mounted in the clutching chamber, one of the outer rings of the single direction clutching bearing is coaxially rotatable with the inner housing, and one of the inner rings of the single direction clutching bearing is correspondingly mounted on the back end of the driving rotary shaft; and wherein the driving rotary shaft correspondingly mounts through both the inner housing and the central gear and is coaxially rotatable with the central gear by being engaged.

Wherein the clutching and speed reducing driving device further comprises at least one bearing, which is correspondingly sleeved onto the inner housing and is fixed in the outer housing to supply a relatively rotating function between the inner housing and the outer housing; wherein the inner housing extends upward to form a shaft mounting portion, number of the bearing is two, one of the bearings is sleeved onto the outer surface of the attaching frame, and another one of the bearings is correspondingly sleeved onto the shaft mounting portion; wherein number of the openings is three and each of the openings is distributed with equal distance among each other.

In addition, the present invention discloses an inner speed shifting dual electric motor, comprising: a main driving motor including a driving rotary shaft, a front end of the driving rotary shaft extending frontward and a back end of the driving rotary shaft extending backward; a clutching and speed reducing driving device being correspondingly sleeved onto the back end of the driving rotary shaft of the main driving motor and coaxially rotatable by being engaged with the driving rotary shaft in one single direction; and an accessory driving motor including a driving shaft, the driving shaft being correspondingly mounted through the clutching and speed reducing driving device, and further being able to push the driving rotary shaft in one single direction to rotate by driving the clutching and speed reducing driving device.

Wherein the clutching and speed reducing driving device comprises an outer housing, an inner housing, a speed reducing gear train, and a single direction clutching bearing; wherein the outer housing is a hollowing housing with openings on two ends, and an inner gear ring is disposed on the middle portion of the inner ring surface of the outer housing, a plurality of cog structures are disposed on the inner ring surface of the inner gear ring; the inner housing is a housing with hollowing inner and circular outer ring surface and mounted through the outer housing corresponding the cog structure and correspondingly rotates inside the outer housing, a plurality of openings are mounted on the outer ring surface of the inner housing, and the inner housing extends downward to form an attaching frame, a clutching chamber is in the inward concave of the attaching frame; wherein the speed reducing gear train is correspondingly mounted in the inner housing, comprising a central gear and a plurality of speed reducing gears, the central gear is correspondingly mounted in the center of the inner housing, number of the speed reducing gears corresponds to the openings, and the speed reducing gears are correspondingly disposed around a periphery of the central gear and fits to the central gear with each other, each of the speed reducing gears has a disposed location, and each of the disposed locations respectively corresponds to one of the openings, each of the speed reducing gear locally mounts through the hole and fits to the cog structure;

wherein the single direction clutching bearing is correspondingly mounted in the clutching chamber, one of the outer rings of the single direction clutching bearing is coaxially rotatable with the inner housing, and one of the inner rings of the single direction clutching bearing is correspondingly sleeved onto the back end of the driving rotary shaft; and wherein the driving rotary shaft correspondingly mounts through both the inner housing and the central gear and is coaxially rotatable with the central gear by being engaged.

Moreover, the present invention discloses a clutching and speed reducing driving device, comprising: an outer housing being a hollowing housing with openings on two ends, and an inner gear ring being disposed on the middle portion of the inner ring surface of the outer housing, a plurality of cog structures being disposed on the inner ring surface of the inner gear ring; an inner housing being a housing with hollowing inner and circular outer ring surface, corresponding to the cog structure mounted through the outer housing and correspondingly rotating inside the outer housing, a plurality of openings being sleeved onto the outer ring surface of the inner housing, and the inner housing extending frontward to form an attaching frame, a clutching chamber being in the inward concave of the attaching frame; a speed reducing gear train being correspondingly mounted in the inner housing, comprising a central gear and a plurality of speed reducing gears, the central gear being correspondingly mounted in the center of the inner housing, number of the speed reducing gears corresponding to the openings, and the inner housing correspondingly towards the backward surface of the central gear mounting on an opening to allow a driving shaft to mount through the central gear for pushing the central gear to rotate; the speed reducing gears being correspondingly disposed around a periphery of the central gear and fitting to the central gear with each other, each of the speed reducing gears having a disposed location, and each of the disposed locations respectively corresponding to one of the openings, each of the speed reducing gear locally mounting through the hole and fits to the cog structure; and a single direction clutching bearing being correspondingly mounted in the clutching chamber, one of the outer rings of the single direction clutching bearing being coaxially rotatable with the inner housing.

In design, the dual electric driving device of the present invention utilizes a main driving motor and an accessory driving motor with two different rotational speeds or with the same rotational speed to easily supply sufficient initial dynamic to overcome the frictional resistance instead of uplifting the horsepower to a high limitation for the main driving motor and the accessory driving motor when the present invention is applied to the driving device such as the electric bicycle and so on, and which correspondingly drives the shifting driving shaft on the section of road needing high dynamic consumption such as start-up on the uphill. As a result, it can prevent the power from consuming too much and can be expected to achieve the goal of electricity-saving and then further improve the continuity of a ride driven by the electricity. And moreover, the technical contents and characteristics of the present invention will be apparent with the detailed description of a preferred embodiment accompanied with related drawings as follows.

DETAILED DESCRIPTION OF THE PREFERRED EMBODIMENTS

The technical contents and characteristics of the present invention will be apparent with the detailed description of a preferred embodiment accompanied with related drawings as follows. For simplicity, the same numerals are used for the same respective elements in the description of the following preferred embodiments and the illustration of the drawings.

In the following detailed description, example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and as those skilled in the art would realize, the described embodiments may be modified in various different ways, all without departing from the spirit or scope of the present invention.

Except extra definitions, the terminology (including technical and scientific terminology) and proper nouns used later contain the same meanings as those known by the person skilled in the art of the present field in practical. For example, the terminology defined in common used dictionaries should be realized having the identical meanings as it in contents of the related field. And except being defined in latter sections of the specification, its meanings should not extremely ideally or extremely formally be understood.

Figure 1:
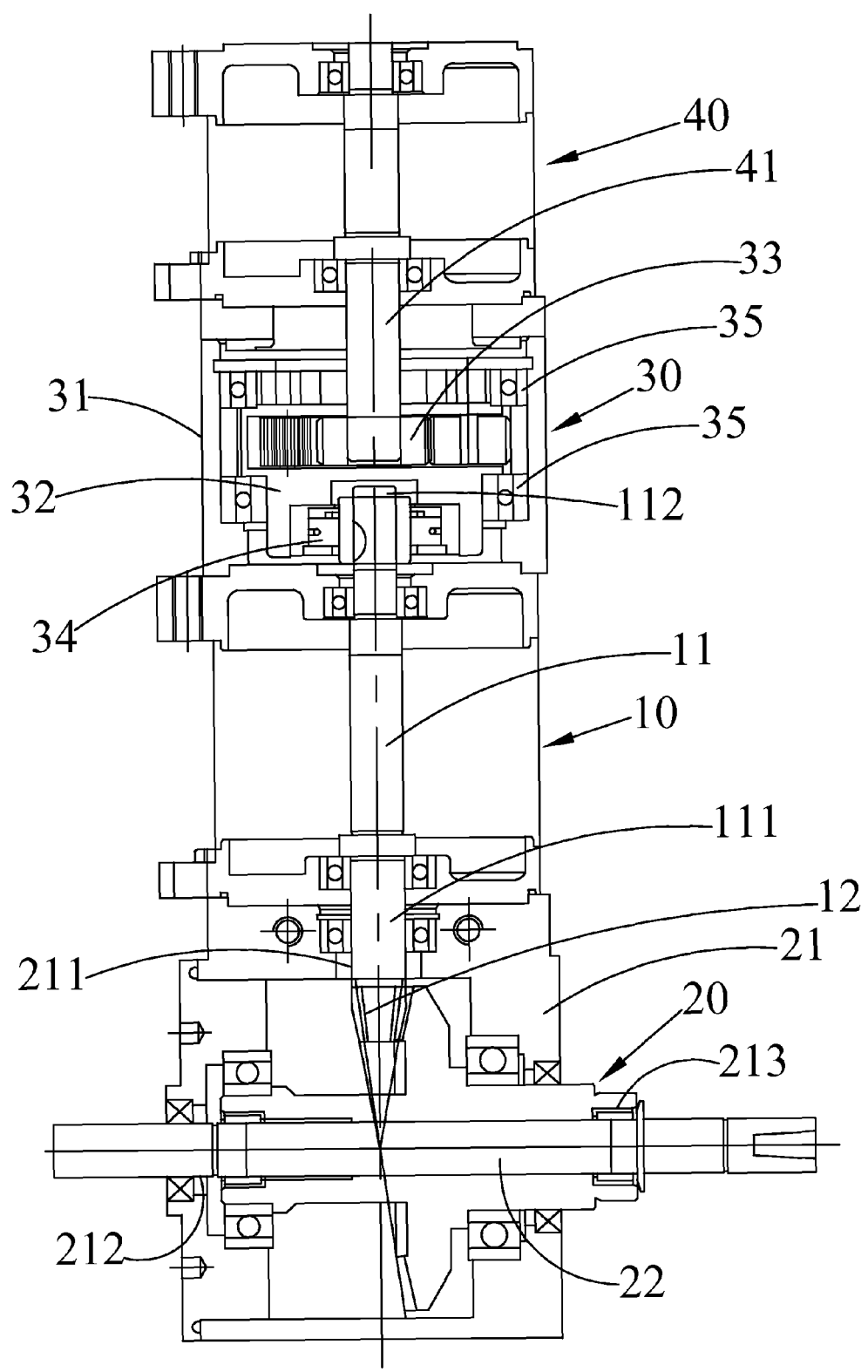
FIG. 1 is a schematic diagram showing the arrangement of the dual electric driving device of the present invention.
Figure 2:
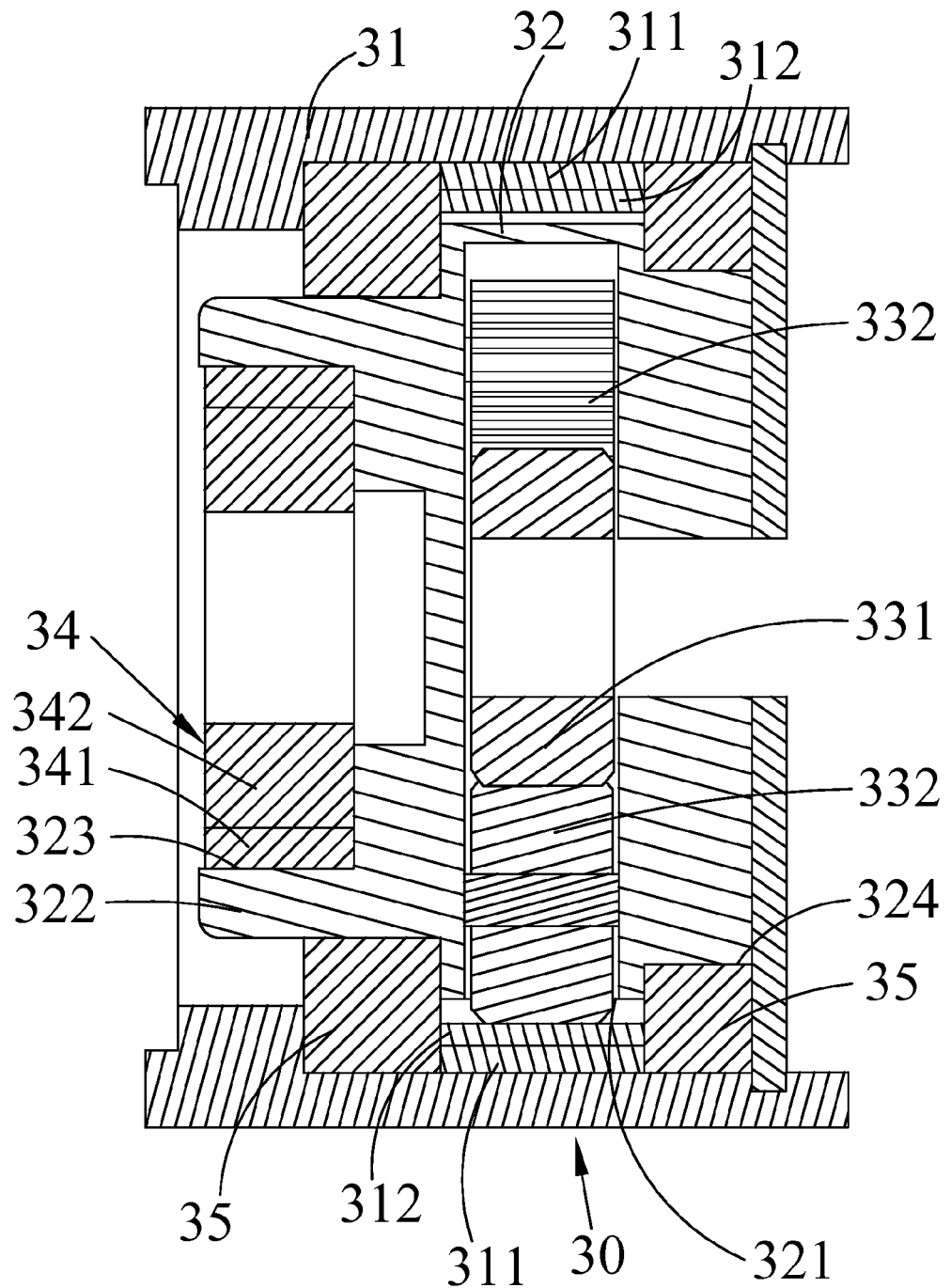
FIG. 2 is a structural schematic diagram of the local components of the dual electric driving device of the present invention.
Figure 3:
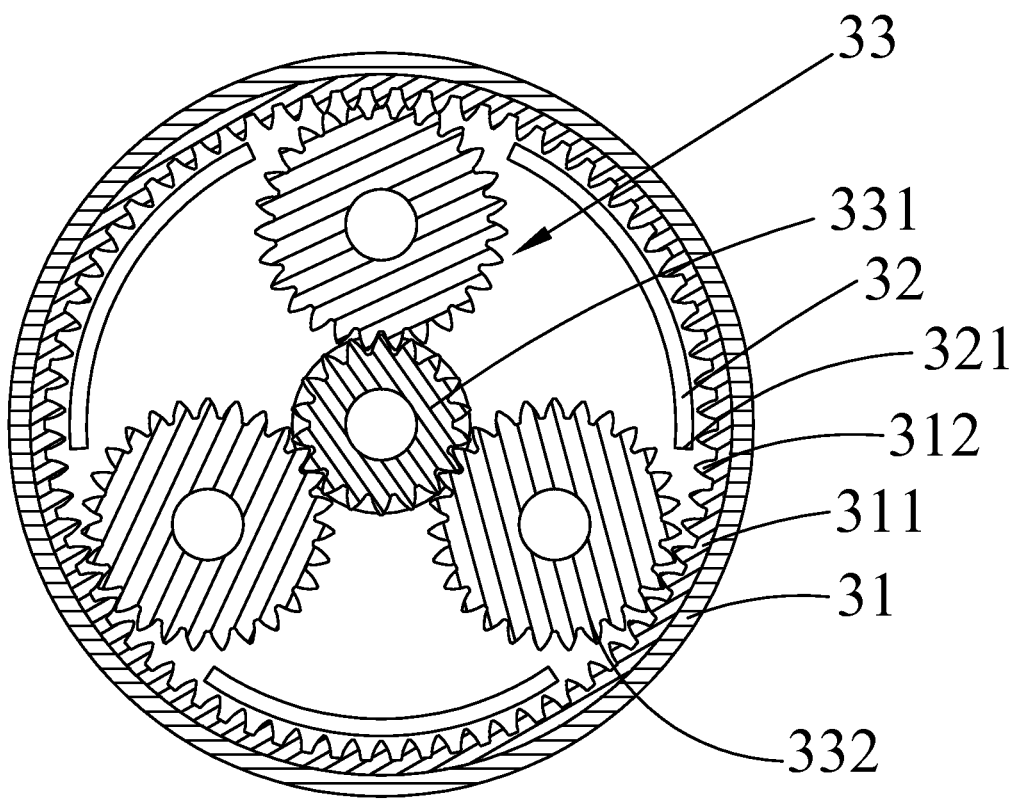
FIG. 3 is a structural schematic diagram of the local components of the dual electric driving device of the present invention.

With reference to FIGS. 1-3, the present invention discloses a dual electric driving device including a driving rotary shaft, a front end of the driving rotary shaft extending downward and a back end of the driving rotary shaft extending upward, with a steering gear being mounted on the front end of the driving rotary shaft. In a preferred embodiment, it comprises: a main driving motor (10), an outputting module (20), a clutching and speed reducing driving device (30), and an accessory driving motor (40).

The main driving motor (10) described above is a vertical axis servo motor. The main driving motor (10) including a driving rotary shaft (11), a front end (111) of the driving rotary shaft (11) extending downward and a back end (112) of the driving rotary shaft (11) extending upward, with a steering gear (12) being mounted on the front end (111) of the driving rotary shaft (11).

The outputting module (20) described above is correspondingly mounted on the steering gear (12). The outputting module (20) includes an outputting frame (21) and a shifting driving shaft (22). The outputting frame (21) has a hole (211) on an upper surface, and the hole (211) allows the steering gear (12) to be mounted through, and a first axial hole (212) and a second axial hole (213) are respectively disposed on two horizontal ends of the outputting frame (21) and passing therethrough, wherein the steering gear (22) is correspondingly mounted to pass through the outputting frame (21) and penetrates both the first axial hole (212) and the second axial hole (213). The shifting driving shaft (22) is rotatable by a driving force of the steering gear (12).

The clutching and speed reducing driving device (30) described above is correspondingly sleeved onto the back end (112) of the driving rotary shaft (11) of the main driving motor (10) and comprises an outer housing (31), an inner housing (32), a speed reducing gear train (33), a single direction clutching bearing (34) and at least one bearing (35).

Wherein the outer housing (31) is a hollowing housing with openings on two ends, and an inner gear ring (311) is disposed on the middle portion of the inner ring surface of the outer housing (31), a plurality of cog structures (312) are disposed on the inner ring surface of the inner gear ring (311); the inner housing (32) is a housing with hollowing inner and circular outer ring surface, and mounted through the outer housing (31) corresponding the cog structure (312) and correspondingly rotates inside the outer housing (31), a plurality of openings (321) are mounted on the outer ring surface of the inner housing (32). The number of the openings (321) is three and each of the openings (321) is distributed with equal distance among each other. Additionally, the inner housing (32) extends downward to form an attaching frame (322), a clutching chamber (323) is in the inward concave of the attaching frame (322). And the inner housing (32) extends upward to form a shaft mounting portion (324).

Wherein the speed reducing gear train (33) is correspondingly mounted in the inner housing (32), comprising a central gear (331) and a plurality of speed reducing gears (332), the central gear (331) is correspondingly mounted in the center of the inner housing (32), number of the speed reducing gears (332) corresponds to the openings (321), and the speed reducing gears are correspondingly disposed around a periphery of the central gear (331) and fits to the central gear (331) with each other, each of the speed reducing gears (332) has a disposed location, and each of the disposed locations respectively corresponds to one of the openings (321), each of the speed reducing gear (332) locally mounts through the hole (321) and fits to the cog structure (312). As a result, when the central gear (331) is driven to rotate, connectedly the inner housing (32) rotates to achieve the effect of reducing the speed. The ratio of the rotating speed of the inner housing (32) to the central gear (331) equals to the ratio of the radius of the central gear (331) to the sum of the radii from the central gear (331) and the speed reducing gear (332). For example, when the ratio 1:3 comes from the radius of the central gear (331) to the sum of the radii from the central gear (331) and the speed reducing gear (332), the ratio of the effect of reducing the speed could be achieved 1:3. The proportion is used as an illustration in figures.

Wherein the single direction clutching bearing (34) is correspondingly mounted in the clutching chamber (323), one of the outer rings (341) of the single direction clutching bearing (34) is coaxially rotatable with the inner housing (32), and one of the inner rings (342) of the single direction clutching bearing (34) is correspondingly mounted on the back end (112) of the driving rotary shaft (11). Wherein the bearing (35) is correspondingly sleeved onto the inner housing (32) and is fixed in the outer housing (31) to supply a relatively rotating function between the inner housing (32) and the outer housing (31). The number of the bearing (35) is two, one of the bearings (35) is sleeved onto the outer surface of the attaching frame (322), and another one of the bearings (35) is correspondingly sleeved onto the shaft mounting portion (324).

The accessory driving motor (40) described above is a vertical axis servo motor outputting a different or the same torque as the main driving motor (10) and has a driving rotary shaft (41). The driving rotary shaft (41) correspondingly mounts through both the inner housing (32) and the central gear (331) and is coaxially rotatable with the central gear (331) by being engaged then further drives the inner housing (32) after the effect of reducing the speed, and assists the rotation of the driving rotary shaft (11) of the main driving motor (10) which is selectively driven by the dynamics.

Through variations in design based on ingenuity of the designer, the dual electric driving device of the present invention utilizes the connecting relationship between a main driving motor (10) and an accessory driving motor (40) to further supply more than two kinds of the rotational outputting function. Thus it can achieve a linear output different from the torsional output generated by the traditional single motor. When the present invention is applied to the driving device, such as the electric bicycle and so on, and correspondingly drives the shifting driving shaft (22) on the section of road needing high dynamic consumption such as start-up on the uphill, it can easily supply sufficient initial dynamic to overcome the frictional resistance instead of uplifting the horsepower to a high limitation for the main driving motor (10) and the accessory driving motor (40). As a result, it can prevent the power from consuming too much. In addition, because the present invention adopts the dual motors with the concept of mother-and-son and operates through the inner speed shifting system of the motor machine, the motor itself still has the best performance of torsion anywhere and anytime after being adjusted through frequency-switching and voltage-regulating by the mother-and-son dual motors at start-up when the motor is full of loadings. Therefore, it can be expected to achieve the goal of electricity-saving and then further improve the continuity of a ride driven by the electricity. The present invention provides a high practical applicability of which the prior art extremely lacks. Obviously, the invention improves over the prior art.

The intuitive machine of the present invention could expectedly be applied to the electric vehicles such as electric bicycle, electric motorcycle and electric car, etc. as an electric driving device and replenish the deficiency of either the mother or the son motor by cooperating both motors together as starting up under the condition of full of loadings to ensure the whole process of start-up operates under the mode of the best torsional performance for achieving the goal of supplying sufficient horsepower within the three actions including the start-up, the acceleration and the uphill movement. This effect of driving could not be done by the single motor in current technique. And wherein the applications and the functional flows of the main driving motor (10) and the accessory driving motor (40) are:

1. The volume of the main driving motor is designed for the car speed between 30 km/hour and the highest driving speed of the car. The main operations are functions of the high speed forward movement, the back movement, and the electric brake as well as the electric recharge, etc.

2. After reducing the speed, the accessory driving motor supplies over three to seven times of torsion to assist and to solve the problem of deficient torsion the main driving motor (10) needs under the action of starting up or under the condition of the car speed on the plane between the start-up and 30 km/hour, or under the condition of the torsion needed when the car moves uphill or immediately speeds up. The main function is to be the assistance for the dynamic action such as the start-up, the acceleration and the uphill movement. In addition, the second function is to be designed as the back-up motor of the main driving motor (10) to avoid the main driving motor (10) from unexpectedly breaking down. This characteristic is very important to the development and the safety of the electric motor.

Figure 4:
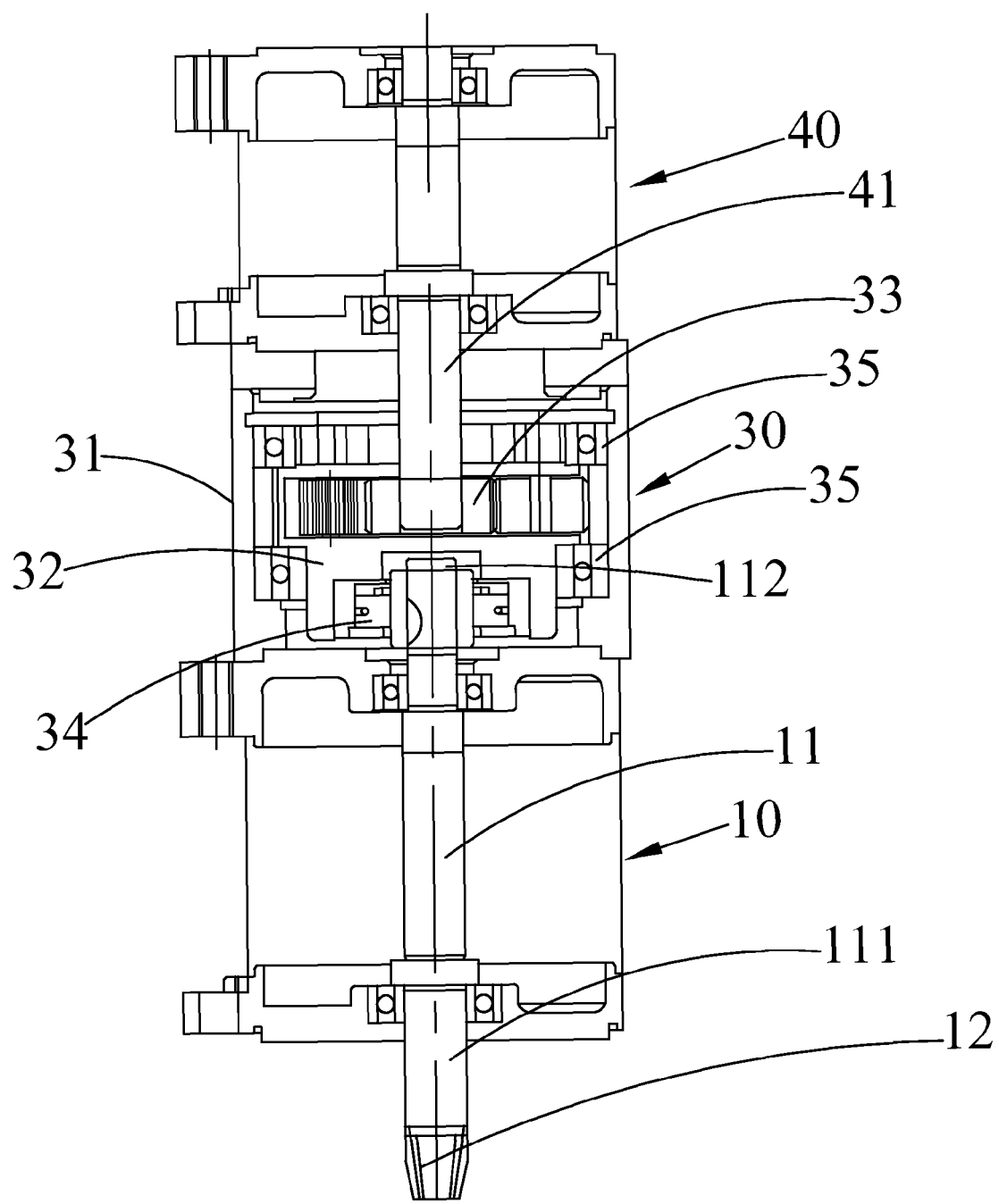
FIG. 4 is a schematic diagram showing the arrangement of the local components of the dual electric driving device of the present invention.

In addition, with reference to FIG. 4, the present invention may selectively be applied to other electric vehicles (for example, the electric motorcycle or other bearing tools with electric movement), the essence of the present invention is an inner speed shifting dual electric motor disclosed in the specification. The inner speed shifting dual electric motor comprises the components of a main driving motor (10), a clutching and speed reducing driving device (30) and an accessory driving motor (40). The corresponding relationship of the structure will not be repeated. Through taking the component apart the motor, it can be effectively corresponded to and applied to other kinds of the electric driving devices.

While the invention has been described by means of specific embodiments, numerous modifications and variations could be made thereto by those skilled in the art without departing from the scope and spirit of the invention set forth in the claims.

What is claimed is:

1. A dual electric driving device, comprising:
a main driving motor including a driving rotary shaft, and the main driving motor having an upper side and a lower side, a front end of the driving rotary shaft extending downward toward the lower side of the main driving motor and a back end of the driving rotary shaft extending upward toward the upper side of the main driving motor, with a steering gear being mounted on the front end of the driving rotary shaft;
an outputting module being correspondingly mounted on the steering gear, the outputting module including a shifting driving shaft being rotatable by a driving force of the steering gear;
a clutching and speed reducing driving device being correspondingly sleeved partially onto the back end of the driving rotary shaft of the main driving motor and coaxially rotatable by being engaged with the driving rotary shaft in only one single direction; and
an accessory driving motor including a driving shaft, the driving shaft being correspondingly mounted partially through the clutching and speed reducing driving device, and further being able to push the driving rotary shaft in only one single direction to rotate by driving the clutching and speed reducing driving device;
wherein the clutching and speed reducing driving device comprises an outer housing, an inner housing, a speed reducing gear train, and a single direction clutching bearing;
wherein the outer housing is a hollowing housing with openings on two ends, and an inner gear ring is disposed on the middle portion of the inner ring surface of the outer housing, a plurality of cog structures are disposed on the inner ring surface of the inner gear ring; the inner housing is a housing with hollowing inner and circular outer ring surface, and mounted through the outer housing corresponding the cog structure and correspondingly rotates inside the outer housing, a plurality of openings are located on a periphery of the circular outer ring surface of the inner housing, and the inner housing extends downward to form an attaching frame, a clutching chamber is in the inward concave of the attaching frame;
wherein the speed reducing gear train is correspondingly mounted in the hollowing inner of the inner housing, comprising a central gear and a plurality of speed reducing gears, the central gear is correspondingly mounted in the center of the inner housing, a number of the speed reducing gears corresponds to a number of the openings, and the speed reducing gears are correspondingly disposed around a periphery of the central gear and fits to the central gear with each other, each of the speed reducing gears has a disposed location, and each of the disposed locations respectively corresponds to one of the openings, each of the speed reducing gear locally mounts through the openings and fits to the cog structure;
wherein the single direction clutching bearing is correspondingly mounted in the clutching chamber, an outer ring of the single direction clutching bearing is coaxially rotatable with the inner housing, and an inner ring of the single direction clutching bearing is correspondingly mounted on the back end of the driving rotary shaft; and
wherein the driving rotary shaft correspondingly mounts through both the inner housing and the central gear and is coaxially rotatable with the central gear by being engaged.

2. The dual electric driving device of claim 1, wherein the outputting module further comprises an outputting frame having a hole on an upper surface to allow the steering gear to be mounted through, and a first axial hole and a second axial hole being respectively disposed on two horizontal ends of the outputting frame and passing therethrough;
   wherein the steering gear correspondingly is mounted to pass through the outputting frame and penetrates both the first axial hole and the second axial hole.

3. The dual electric driving device of claim 1, wherein the clutching and speed reducing driving device further comprises two bearings, which is correspondingly sleeved onto the inner housing and is fixed in the outer housing to supply a relatively rotating function between the inner housing and the outer housing.

4. The dual electric driving device of claim 3, wherein the inner housing extends upward to form a shaft mounting portion, one of the bearings is sleeved onto the outer surface of the attaching frame, and another one of the bearings is correspondingly sleeved onto the shaft mounting portion.

5. The dual electric driving device of claim 4, wherein number of the openings is three and each of the openings is distributed with equal distance among each other.

6. An inner speed shifting dual electric motor device, comprising:
   a main driving motor including a driving rotary shaft, a front end of the driving rotary shaft extending frontward and a back end of the driving rotary shaft extending backward;
   a clutching and speed reducing driving device being correspondingly sleeved partially onto the back end of the driving rotary shaft of the main driving motor and coaxially rotatable by being engaged with the driving rotary shaft in only one single direction; and
   an accessory driving motor including a driving shaft, the driving shaft being correspondingly mounted partially through the clutching and speed reducing driving device, and further being able to push the driving rotary shaft in only one single direction to rotate by driving the clutching and speed reducing driving device;
   wherein the clutching and speed reducing driving device comprises an outer housing, an inner housing, a speed reducing gear train, and a single direction clutching bearing;
   wherein the outer housing is a hollowing housing with openings on two ends, and an inner gear ring is disposed on the middle portion of the inner ring surface of the outer housing, a plurality of cog structures are disposed on the inner ring surface of the inner gear ring; the inner housing is a housing with hollowing inner and circular outer ring surface and mounted through the outer housing corresponding the cog structure and correspondingly rotates inside the outer housing, a plurality of openings are located on a periphery of the circular outer ring surface of the inner housing, and the inner housing extends downward to form an attaching frame, a clutching chamber is in the inward concave of the attaching frame;
   wherein the speed reducing gear train is correspondingly mounted in the hollowing inner of the inner housing, comprising a central gear and a plurality of speed reducing gears, the central gear is correspondingly mounted in the center of the inner housing, a number of the speed reducing gears corresponds to a number of the openings, and the speed reducing gears are correspondingly disposed around a periphery of the central gear and fits to the central gear with each other, each of the speed reducing gears has a disposed location, and each of the disposed locations respectively corresponds to one of the openings, each of the speed reducing gear locally mounts through the openings and fits to the cog structure;
   wherein the single direction clutching bearing is correspondingly mounted in the clutching chamber, an outer ring of the single direction clutching bearing is coaxially rotatable with the inner housing, and an inner ring of the single direction clutching bearing is correspondingly sleeved onto the back end of the driving rotary shaft; and
   wherein the driving rotary shaft correspondingly mounts through both the inner housing and the central gear and is coaxially rotatable with the central gear by being engaged.

7. The inner speed shifting dual electric motor of claim 6, wherein the clutching and speed reducing driving device further comprises two bearings, which is correspondingly sleeved onto the inner housing and is fixed in the outer housing to supply a relatively rotating function between the inner housing and the outer housing.

8. The inner speed shifting dual electric motor of claim 7, wherein the inner housing extends backward to form a shaft mounting portion, one of the bearings is sleeved onto the outer surface of the attaching frame, and another one of the bearings is correspondingly sleeved onto the shaft mounting portion.

9. The inner speed shifting dual electric motor of claim 8, wherein number of the openings is three and each of the openings is distributed with equal distance among each other.

10. A clutching and speed reducing driving device, comprising:
   an outer housing being a hollowing housing with openings on two ends, and an inner gear ring being disposed on the middle portion of the inner ring surface of the outer housing, a plurality of cog structures being disposed on the inner ring surface of the inner gear ring;
   an inner housing being a housing with hollowing inner and circular outer ring surface, corresponding to the cog structure mounted through the outer housing and correspondingly rotating inside the outer housing, a plurality of openings being located on a periphery of the circular outer ring surface of the inner housing, and the inner housing extending frontward to form an attaching frame, a clutching chamber being in the inward concave of the attaching frame;
   a speed reducing gear train being correspondingly mounted in the hollowing inner of the inner housing, comprising a central gear and a plurality of speed reducing gears, the central gear being correspondingly mounted in the center of the inner housing, a number of the speed reducing gears corresponding to a number of the openings, and an opening correspondingly mounting on the inner housing to allow a driving shaft to mount through the central gear for pushing the central gear to rotate; the speed reducing gears being correspondingly disposed around a periphery of the central gear and fitting to the central gear with each other, each of the speed reducing gears having a disposed location, and each of the disposed locations respectively corresponding to one of the openings, each of the speed reducing gear locally mounting through the openings and fits to the cog structure; and
   a single direction clutching bearing being correspondingly mounted in the clutching chamber, one of the outer rings of the single direction clutching bearing being coaxially rotatable with the inner housing.

11. The clutching and speed reducing driving device of claim 10, wherein the clutching and speed reducing driving device further comprises two bearings, which are correspondingly sleeved onto the inner housing and are fixed in the outer housing to supply a relatively rotating function between the inner housing and the outer housing.

12. The clutching and speed reducing driving device of claim 11, wherein the inner housing extends backward to form a shaft mounting portion, one of the bearings is sleeved onto the outer surface of the attaching frame, and another one of the bearings is correspondingly sleeved onto the shaft mounting portion.

13. The clutching and speed reducing driving device of claim 12, wherein number of the openings is three and each of the openings is distributed with equal distance among each other.

* * * * *